DE FORREST WOOD.
AUTOMATIC POULTRY FEEDER.
APPLICATION FILED FEB. 13, 1914.
1,107,394.
Patented Aug. 18, 1914.
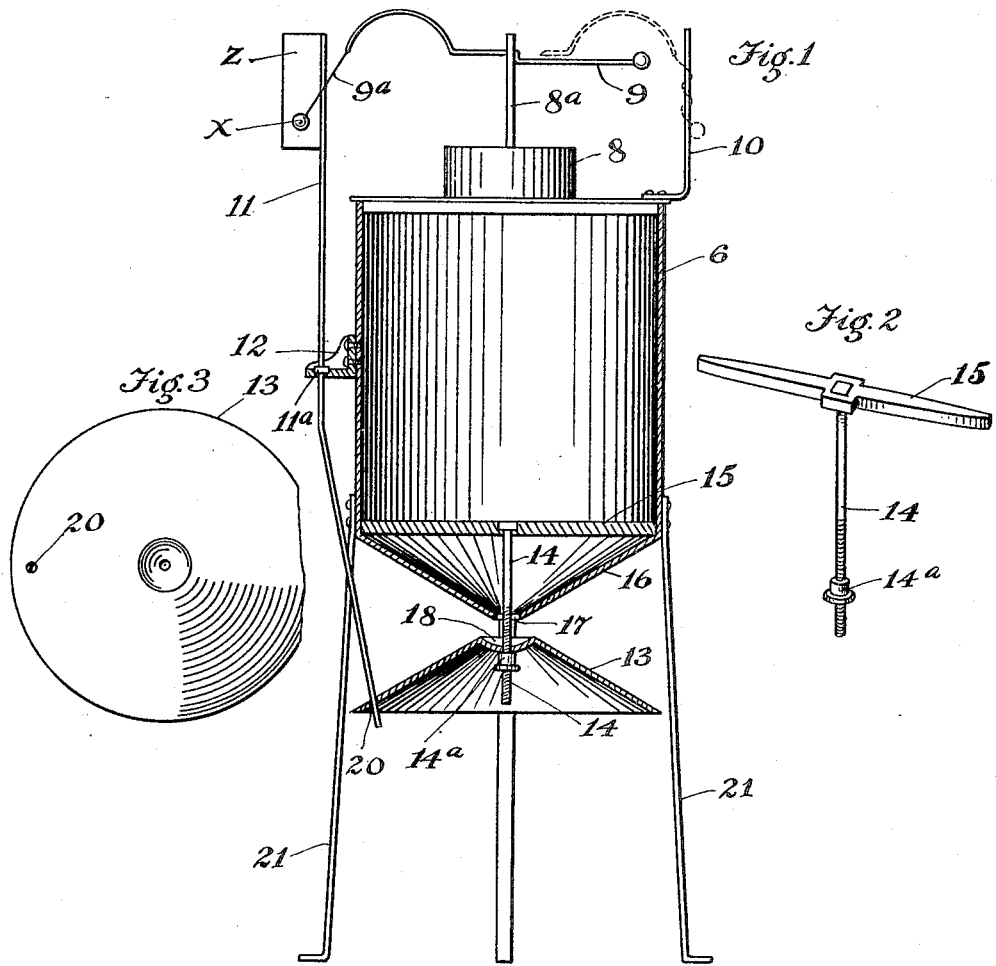
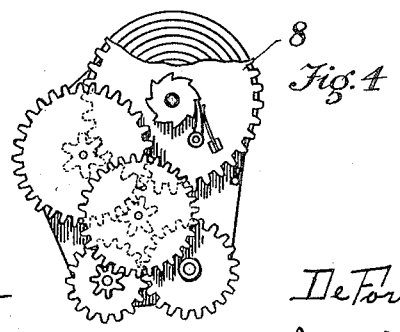
Witnesses:
F. C. Valentine
Anna Watters
Inventor:
De Forrest Wood.
by John A. Bommhardt,
Attorney.

UNITED STATES PATENT OFFICE.

DE FORREST WOOD, OF KIPTON, OHIO.

AUTOMATIC POULTRY-FEEDER.

1,107,394.                    Specification of Letters Patent.    Patented Aug. 18, 1914.

Application filed February 13, 1914. Serial No. 818,525.

*To all whom it may concern:*

Be it known that I, DE FORREST WOOD, citizen of the United States, residing at Kipton, in the county of Lorain and State of Ohio, have invented certain new and useful Improvements in Automatic Poultry-Feeders, of which the following is a specification.

This invention relates to automatic poultry feeders, and especially to that kind thereof in which the feed is distributed or scattered on the ground, a small quantity at a time, and adapted to give a certain amount of exercise to the poultry when feeding.

The device includes a hopper from which the feed is delivered to a distributer which is agitated at intervals by means of a motor which includes, or drives, an escapement of the centrifugal "ball and string" type, so arranged that the ball operates a rod connected to the distributer to agitate the same at each revolution of the ball.

The invention is illustrated in the accompanying drawings in which:—

Figure 1 is a vertical sectional view of the device. Fig. 2 is a detail illustrating the support for the distributer. Fig. 3 is a top view of the distributer. Fig. 4 is a plan of the spring motor mechanism.

Referring specifically to the drawings, 6 indicates a hopper with a tapered bottom 16 having a discharge hole 17. This hopper contains the grain or other feed. Within the hopper is a cross piece 15, loosely mounted, and depending from this is a threaded rod 14 which extends through the hole 17 and supports the conical distributer 13 under the hopper. A nut 14$^a$ on the rod 14 supports the distributer and permits adjustment of its distance from the hopper. The apex of the distributer is cupped as indicated at 18, and the adjustment will be such that a small quantity of grain will flow into the cup, and when the distributer is still or at rest will prevent any further flow through the outlet 17.

A spring motor mechanism 8, which needs no extended description, is mounted on top of the hopper, and drives an upright arbor 8$^a$ which carries a balanced cross arm 9, to one end of which a ball X is connected by a string 9$^a$. A post 10 is fastened to the hopper and projects upwardly so that the string will wind around the same, and then unwind, as the arbor is revolved. At the opposite side of the hopper is a rod 11 which is supported, loosely, by a bracket 12 fixed to the side of the hopper, and a collar 11$^a$ on the rod. At the upper end the rod has a plate Z located in proper position to receive the impact of the ball X of each revolution thereof. The lower end of the rod is bent under the hopper and extends loosely through a hole 20 near the edge of the distributer. The hopper stands on legs 21. The rod 11 is free to vibrate to a certain extent, and in the operation of the device, the clock work motor drives its arbor and carries the ball around, the revolution being intermittently checked by the string winding around the post 10 in a well known manner, and after each release the ball X in its continued revolution will strike the plate Z with sufficient force to vibrate the rod 11, and this vibration will be communicated to the distributer 13 which will thus be agitated, the effect being to spill a certain amount of the grain out of the cup 18 and permit the escape of some more of the grain through the hole 17, and the grain thus released is scattered over the edge of the distributer. The ball X, after striking the plate Z, drops and passes the same and continues its revolution for the next operation. By the means described a certain amount of grain is delivered intermittently during the operation of the device. The loose mounting of the cross bar 15 permits the vibration of the distributer and also of the rod 14 which serves to prevent choking at the outlet 17. The escapement may be adjusted to control the intervals between each operation.

What I claim as new is:—

1. In an automatic feeding device, the combination of a feed distributing member, a motor, means for loosely supporting said member, and means operated by the motor for intermittently vibrating said member.

2. In an automatic feeding device, the combination of a feed distributing member, a motor, a ball and string escapement for said motor, and means intermittently operated by said ball for actuating said distributing member.

3. In an automatic feeding device, the combination of a hopper having an outlet at the bottom, a feed distributer under said outlet, a suspending rod for said distributer, extending through said outlet, a vibrating rod connected to said distributer to vibrate the same and the suspending rod, and means to intermittently vibrate said vibrating rod.

4. In an automatic feeding device, the combination of a hopper having an outlet at the bottom, a feed distributer under said outlet, a suspending rod for said distributer, extending through said outlet, a vibrating rod connected to said distributer to vibrate the same and the suspending rod, means to intermittently vibrate said vibrating rod, said means comprising a motor and a revolving "ball and string" escapement therefor, the ball being arranged to operate the rod at each revolution thereof.

5. In an automatic feeding device, the combination of a vibrating feed-distributing member, a motor, a revoluble "ball and string" escapement for said motor, a rod connected to said member, and a plate attached to said rod and projecting into position to be struck by the ball during the revolution thereof, to vibrate said rod and member.

In testimony whereof, I do affix my signature in presence of two witnesses.

DE FORREST WOOD.

Witnesses:
JOHN A. BOMMHARDT,
A. A. BEMIS.

Copies of this patent may be obtained for five cents each, by addressing the "Commissioner of Patents, Washington, D. C."